US005668369A

United States Patent [19]

Oraby

[11] Patent Number: 5,668,369
[45] Date of Patent: Sep. 16, 1997

[54] METHOD AND APPARATUS FOR LITHOLOGY-INDEPENDENT WELL LOG ANALYSIS OF FORMATION WATER SATURATION

[75] Inventor: Moustafa E. Oraby, Houston, Tex.

[73] Assignee: Atlantic Richfield Company, Los Angeles, Calif.

[21] Appl. No.: 672,318

[22] Filed: Jun. 28, 1996

Related U.S. Application Data

[60] Provisional application No. 60/008,773 Dec. 18, 1995.

[51] Int. Cl.$^6$ .................................................. G01V 5/10
[52] U.S. Cl. .............................. 250/269.5; 250/266
[58] Field of Search ........................... 250/266, 269.4, 250/269.5

[56] References Cited

U.S. PATENT DOCUMENTS

| | | | |
|---|---|---|---|
| 2,528,882 | 11/1950 | Hayward | 73/153 |
| 2,648,056 | 8/1953 | Jakosky | 340/18 |
| 3,802,259 | 4/1974 | Eckels | 73/153 |
| 4,524,274 | 6/1985 | Scott | 250/269.4 |
| 4,543,821 | 10/1985 | Davis, Jr. | 73/153 |
| 4,570,067 | 2/1986 | Gadeken | 250/266 |
| 4,644,283 | 2/1987 | Vinegar et al. | 324/376 |
| 4,716,973 | 1/1988 | Cobern | 175/50 |
| 4,760,252 | 7/1988 | Albats et al. | 250/269 |
| 4,981,036 | 1/1991 | Curry et al. | 73/151 |
| 5,095,745 | 3/1992 | Desbrandes | 73/152 |

OTHER PUBLICATIONS

Tittle, "Prediction of Compensated Neutron Response Using Neutron Macroparameters", *Nucl. Geophys.*, vol. 2, No. 2 (Pergamon, 1988), pp. 95–103.

Wiley and Patchett, "CNL Neutron Porosity Modeling, A Step Forward", *SPWLA Thirtieth Annual Logging Symposium* (1989), Paper OO.

Oraby, "N3LIP: Lithology Independent Porosity Calculations Using Three Neutron Measurements", *SPWLA Thirty-third Annual Logging Symposium* (1992), Paper O.

Oraby et al., "A Lithology–Independent Porosity Model Using Three Neutron Measurements: Part II—Applications and Error Analysis", 68th *Annual Technical Conference and Exhibition of the Society of Petroleum Engineers* (1993), Paper SPE 26435.

*Primary Examiner*—David P. Porta
*Assistant Examiner*—David Vernon Bruce
*Attorney, Agent, or Firm*—Anderson, Levine & Lintel

[57] ABSTRACT

A system and method of determining porosity and water saturation of a formation surrounding a wellbore is disclosed. Well logs are taken to obtain near and far thermal and epithermal neutron log measurements, and to obtain pulsed neutron capture log measurements, at varying depths along the borehole, with the results stored in a computer memory. The computer is then operated, using an assumed porosity value, to calculate the matrix diffusion length according to two independent methods. If the two matrix diffusion lengths do not closely match, the assumed porosity value is adjusted, and the method repeated. Upon convergence of the matrix diffusion lengths, the adjusted assumed porosity value is used to determine the water saturation of the formation. A set of three equations in three unknowns is solved, where the three equations are indicative of the pulsed neutron capture cross-section, and also the near and far thermal neutron absorption. The water saturation of the formation is then determined, without requiring extrinsic data regarding the lithology of the matrix.

22 Claims, 3 Drawing Sheets

METHOD AND APPARATUS FOR LITHOLOGY-INDEPENDENT WELL LOG ANALYSIS OF FORMATION WATER SATURATION

This application claims the benefit of U.S. Provisional Application No. 60/008,773, filed Dec. 18, 1995.

This invention is in the field of geological exploration and production, and is more particularly directed to analysis of well log measurements to determine the nature of liquid-bearing formations.

BACKGROUND OF THE INVENTION

Well logs are commonly used in the field of oil and gas production and exploration to determine the nature and attributes of the geological formations surrounding wellbores. The logging of a well may, of course, be done in the process of drilling the well, to correlate the well to seismic surveys and to specifically analyze the formations into which drilling has taken place. Well logs are also used in the infill drilling stage of field development, and also in reservoir maintenance and field management at producing locations.

Various types of conventional well logs, using different physical mechanisms, are commonly used. For example, well logs may be taken by gamma ray measurements of the natural radioactivity of formations surrounding the borehole. Another type of log analyzes formation density by emitting gamma radiation into the formation and by measuring the back-scatter of gamma radiation from the formation. Conventional sonic logs measure sonic energy that has been reflected by the surrounding formation at multiple locations along the logging tool from the sonic source. Another type of conventional well log measures the electrical conductivity of the surrounding formation to identify whether fluids present in the formation are water or oil. These conventional well log measurements are generally used, individually, to provide indications of the properties of the sub-surface formations surrounding the location in the wellbore at which the well log measurements were taken.

These conventional well logging techniques are generally useful in analyzing the structure and composition of formations into which the drilling operation has progressed. Certain attributes of the formation are especially important in determining whether or not oil is present therein. The porosity of the formation is a measure of the fluid capacity of the formation, as it indicates the extent to which the volume of the formation is occupied by rock, or rather the extent of the volume of the formation that may instead be occupied by oil. Since a porous formation may be occupied by either water (generally saline water) or oil, water saturation of the reservoir fluid is another important parameter in determining whether viable oil production is available.

The parameters of porosity and water saturation may not be determined solely from well logs according to conventional analysis techniques. As described in my copending application Ser. No. 07/989,863, filed Dec. 14, 1992, and incorporated herein by this reference, conventional porosity determinations required extrinsic information regarding the lithology of the formation. As such, core sampling and material analysis is generally performed, which is necessarily an expensive undertaking, especially considering that drilling must stop and the drill string retrieved from the borehole in order to perform such sampling. Furthermore, if casing has already been installed in the borehole, core sampling is rendered impossible. While the lithology of the formations may also be estimated from analysis of drilling cuttings as they arrive at the surface during the drilling of the well, these estimates are generally poor considering that cuttings generated at the bit mix with material from the wellbore sidewalls at shallower depths, and may even be blocked from arriving at the surface.

Given that porosity cannot be directly determined from well log analysis, it is therefore apparent that conventional logging techniques are also unable to estimate the water saturation of the formation in a manner that does not also require extrinsic information regarding the lithology of the formation. For example, as noted above, conventional well log measurements have been used, individually and in combination with extrinsic information, to indicate certain properties of the surrounding formation. An example of such a conventional technique has been used to determine water saturation from the response of a pulsed neutron capture (PNC) log measurement. According to one such conventional approach, the PNC response $\Sigma_a$ may be represented as:

$$\Sigma_a = \phi S_w \Sigma_{aw} + \phi(1-S_w)\Sigma_{ao} + (1-\phi)\Sigma_{am}$$

where $\Sigma_{ao}$, $\Sigma_{aw}$, $\Sigma_{am}$ are the log response components due to oil, water, and matrix, respectively, which respectively correlate to the absorption cross-section of oil, water, and matrix. In this equation, $\Phi$ is the porosity of the formation. According to this conventional method, the $\Sigma_{ao}$, $\Sigma_{aw}$, $\Sigma_{am}$, and $\Phi$ components are set to assumed values (either based on extrinsic information regarding the formation, or upon assumptions or estimates). Upon obtaining the PNC response $\Sigma_a$ from the well log measurement, therefore, this conventional method was able to solve for the factor $S_w$, which is the water saturation of the formation.

Of course, as is evident from the foregoing, either extrinsic information is required to provide the porosity and matrix absorption cross-sections, or the human analyst must venture a guess as to the value of these factors, in order to derive a water saturation value. The cost required to obtain such direct measurements, or the inaccuracy of guessing the value of these factors, renders such conventional water saturation analysis either impracticable or of minimal value.

It is therefore an object of the present invention to provide a method and system for determining the porosity and water saturation of formations surrounding the wellbore directly from well log data.

It is a further object of the present invention to provide such a method and system which does not depend upon extrinsic information regarding the lithology of the formations in order to determine the water saturation content of a formation.

It is a further object of the present invention to provide such a method and system which may be used in the logging of cased wellbores.

It is a further object of the present invention to provide such a method and system which can determine the salinity of the water saturation in the formation.

It is a further object of the present invention to provide such a method and system which uses certain conventional well log measurements in combination with one another to provide a more direct indication of the presence of hydrocarbons in the formations being logged.

Other objects and advantages of the present invention will be apparent to those of ordinary skill in the art having reference to the following specification together with the claims.

SUMMARY OF THE INVENTION

The invention may be incorporated into an automated system for analyzing thermal and epithermal neutron well logs and pulsed neutron capture logs to determine the porosity and water saturation of the formation surrounding a wellbore. According to the present invention, a system computer retrieves the actual neutron counting rates from the thermal and epithermal neutron logs, and also the results of pulsed neutron capture logs. A first value of porosity is assumed, preferably a value that is lower than the actual expected porosity. The matrix diffusion length is then calculated by the system computer from the thermal and epithermal neutron logs, using this assumed porosity, and is also calculated by the system computer from a determination of the matrix absorption cross section, based upon the PNC logs and the thermal and epithermal neutron logs as well as the assumed porosity value. The matrix diffusion lengths determined according to these two independent techniques are then compared, and are recalculated using an adjusted assumed porosity until the matrix diffusion lengths differ by less than a desired error value, at which time the most recent porosity value is used as the actual porosity value. This porosity value is then used in solving a system of equations, using the actual absolute neutron counting rates of the near and far detectors of the thermal and epithermal neutron log tool, from which the water saturation is readily determined.

DETAILED DESCRIPTION OF THE PREFERRED EMBODIMENT

Figure 1:
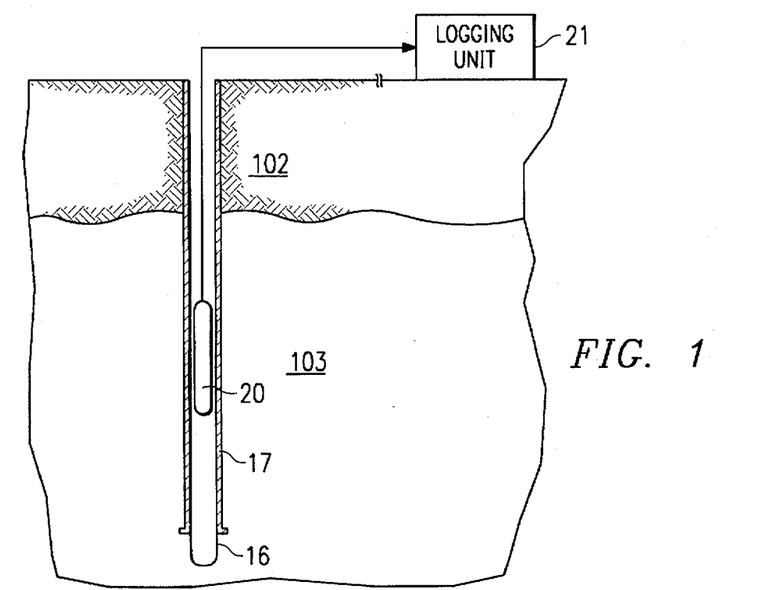
FIG. 1 is a cross-sectional diagram of a portion of the earth having a wellbore that is being wireline logged.

Referring to FIG. 1, an example of a well logging operation utilizing the preferred embodiment of the present invention will be described. FIG. 1 illustrates well logging tool 20, of conventional "wireline" type, lowered into wellbore 16. Wellbore 16 was previously drilled into the earth through sub-surface formation 102 and into sub-surface formation 103, for purposes of producing oil from sub-surface reservoirs. In this example, casing 17 is in place within wellbore 16 in the conventional manner; the logging measurements will be taken through casing 17, in this example.

In the example of FIG. 1, logging tool 20 corresponds to well logging tools of different types. According to the preferred embodiment of the invention, well logs of the thermal and epithermal neutron type, the pulsed neutron capture (PNC) type, and (optionally) gamma radiation measurement are used; typically, separate logging tools 20 are used for these types of logs, as will be described hereinbelow. Logging tool 20 may also include other transducers and sensors for other conventional well log measurements. As schematically illustrated in FIG. 1, logging tool 20 is connected to logging unit 21 at the surface, so that the measurements taken in the logging operation may be stored in computer memory.

Figure 2:
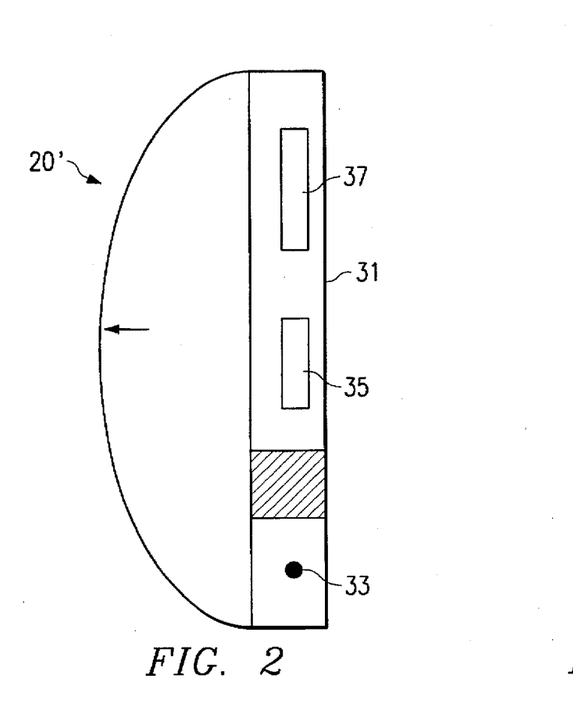
FIGS. 2 and 3 are schematic elevation views of a thermal and epithermal neutron well log tool and a pulsed neutron capture well log tool respectively.

Referring to FIG. 2, tool 20' for performing thermal and epithermal neutron logs as will be useful in the preferred embodiment of the invention is illustrated schematically. As shown therein, tool 20' includes neutron source 33 within tool housing 31, from which a neutrons of energies over a spectrum (including thermal and epithermal energies) are emitted into the surrounding formation. Tool 20' includes a neutron near counter 35 and a neutron far counter 37, each of which are detectors that can detect the receipt of a neutron from the formation and its energy. Neutron near counter 35 is located nearer to source 33 than neutron far counter 37, so that neutron far counter 35 will detect neutrons that have traveled through the surrounding formation for a relatively long distance relative to those detected by neutron near counter 37. Borehole and drilling mud effects may thus be eliminated from the log data, based on the ratio of the near and far neutron counts. Well logging tool 20' for thermal and epithermal neutron well logging may thus be of a conventional type, such as the Dual Porosity Compensated (or CNT-G) tool available from Schlumberger Technology Corporation.

Figure 3:
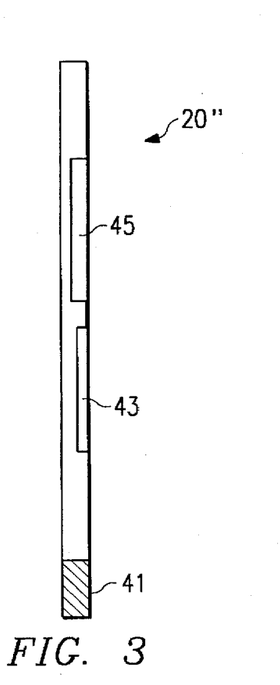

Referring to FIG. 3, well logging tool 20" for performing pulsed neutron capture (PNC) logs is illustrated. Tool 20" includes a (e.g., on the order of 14 MeV) neutron generator 41 which emits neutrons, for example at energies of on the order of 14 MeV, into the surrounding formation. Tool 20" also includes near and far gamma ray counters 43, 45, respectively, which detect and count gamma radiation events. As such, PNC tool 20" measures the gamma radiation produced by absorption of the very low energy neutrons by the surrounding formation. A conventional well log tool useful for pulsed neutron capture (PNC) well logs is the TDT well log tool available from Schlumberger.

Figure 4:
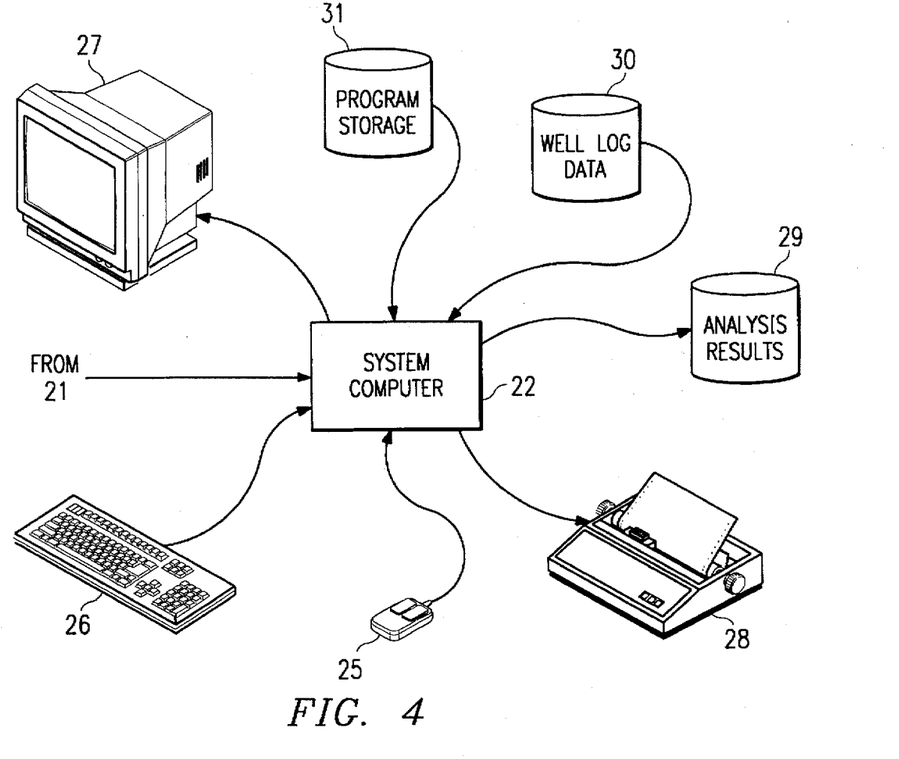
FIG. 4 is a computer system for receiving and analyzing well log data according to the preferred embodiment of the invention.

Referring back to FIG. 1, system computer 22 is a remote computer capable of analyzing the data transmitted thereto, to which the data is transmitted (or stored and transported) from logging unit 21, for analysis. Referring now to FIG. 4, a schematic block diagram of system computer 22 capable of performing the operations described hereinbelow in connection with the preferred embodiment of the present invention will be described. System computer 22 may be implemented by any conventional personal computer or workstation, preferably an UNIX-based workstation such as a SPARCstation available from Sun Microsystems, Inc., and may be implemented either in standalone fashion, or as part of a network arrangement. According to the preferred embodiment of the invention, system computer 22 presents output primarily onto graphics display 27, or alternatively via printer 28; further in the alternative, system computer 22 may store the results of the analysis described hereinbelow on disk storage 29, for later use and further analysis. Keyboard 26 and pointing device (e.g., a mouse, trackball, or the like) 25 are provided with system computer 22 to enable interactive operation. As noted above, system computer 22 may either be located at a data center remote from the survey region, or alternatively (and preferably) is located on site at the survey to provide real-time analysis of the log analysis, as shown in FIG. 1.

System computer 22 is able to communicate with disk storage devices, including external hard disk storage on a network and floppy disk drives. In this embodiment of the invention, system computer 22 is able to retrieve measured well log data from one or more disk storage device 30, according to program instructions that correspond to the method described hereinbelow and that are stored in program disk storage device 31. For operation on system computer 24, of course, the program instructions are written in the form of a computer program (e.g., in the C++ language or any other suitable language) and is stored in computer-readable memory, for example on program disk storage device 31 of FIG. 2; of course, the memory medium storing the computer program may be of any conventional type used for the storage of computer programs, including hard disk drives, floppy disks, CD-ROM disks, magnetic tape, and the like. It is contemplated that disk storage devices 29, 30, 31 are conventional hard disk drives, and as such will be implemented by way of a local area network or by remote access. Of course, while disk storage devices 29, 30, 31, are illustrated as separate devices, a single disk storage device may of course be used to store any and all of the measurement data, as appropriate.

System computer 24 is in communication with logging tool 20, to store the signals therefrom in disk storage 30 for later retrieval as will be described hereinbelow. While FIG. 4 illustrates disk storage devices 29, 30, 31 as each individually and directly connected to system computer 24, it is also contemplated that disk storage devices 29, 30, 31 may be accessible through a local area network or by remote access. Furthermore, while disk storage devices 29, 30, 31, are illustrated as separate devices, a single disk storage device may of course be used to store any and all of the measurement data and program instructions, as appropriate.

Figure 5:
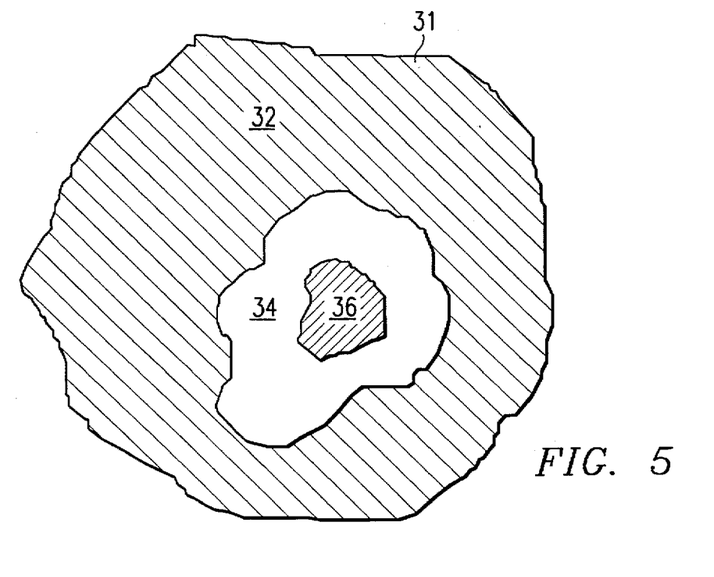
FIG. 5 is a cross-sectional diagram of a formation in the earth having a reservoir containing both oil and water.

Referring now to FIG. 5, the physical mechanisms of the method utilized according to the preferred embodiment of the invention will now be described. FIG. 5 schematically illustrates a formation 31 in the earth having a fluid reservoir contained within matrix 32. Matrix 32 is rock of a certain lithology that is sufficient to maintain the reservoir containing water 34 and oil 36. As water 34 and oil 36 are immiscible with one another, they remain separated in the reservoir surrounded by matrix 32. As is evident from the cross-section of FIG. 5, the value of porosity for this formation 31 will indicate the fractional volume of portion 31 that contains water 34 and oil 36; unity minus the porosity value will conversely indicate the fractional volume occupied by matrix 32 in formation 31. The water saturation value corresponds to the fractional volume of the fluid (water 34 and oil 36 considered together) that is constituted by water 34. Accordingly, knowledge of the porosity and the water saturation values for formation 31 will allow one to determine the amount of oil 36 present, relative to matrix 32 and to water 34.

Figure 6:
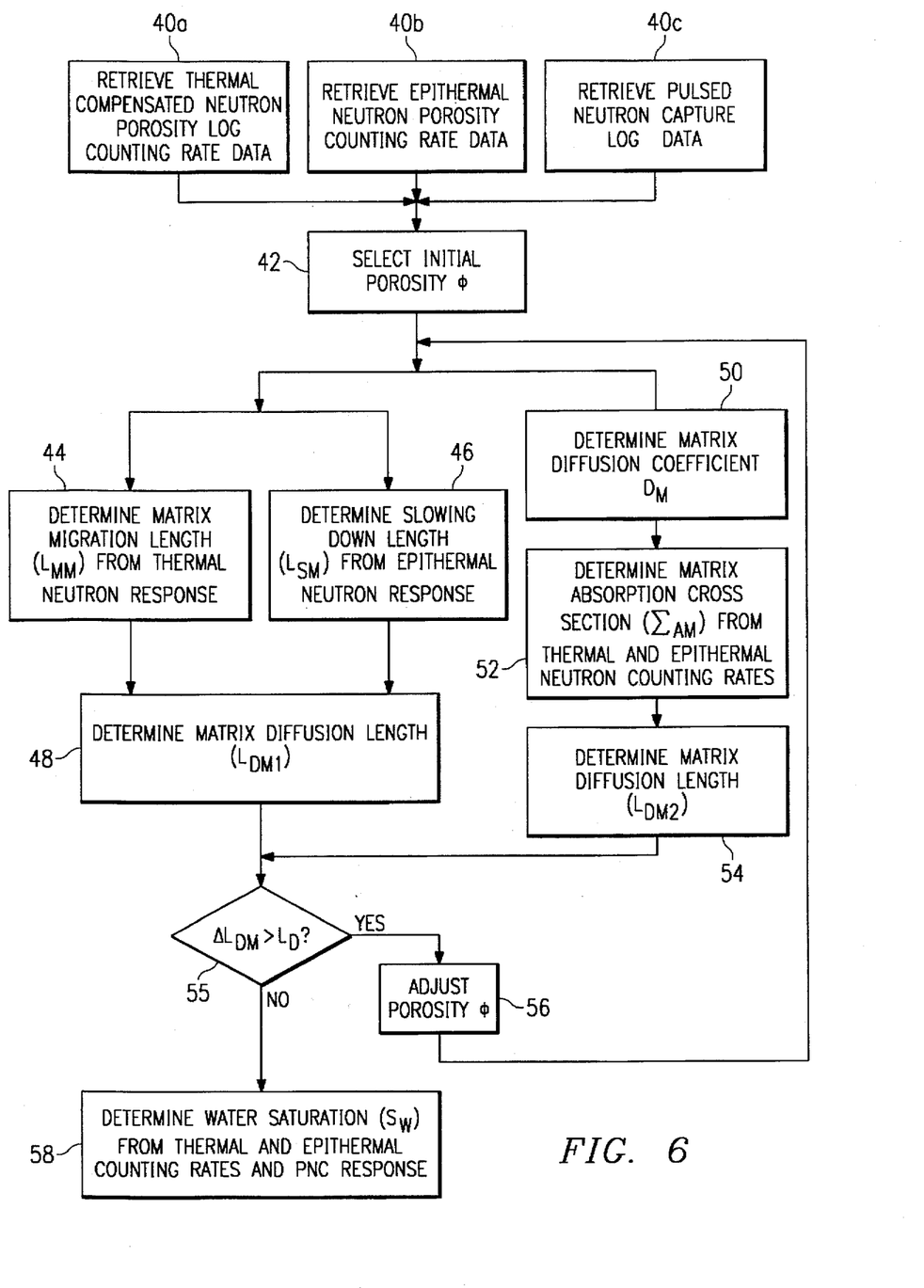
FIG. 6 is a flow chart illustrating the operation of a method of determining porosity and water saturation according to the preferred embodiment of the invention.

Referring now to FIG. 6, a method of obtaining and analyzing well log data to determine both the porosity and also the water saturation of formations, without requiring extrinsic information regarding the lithology of the formation, will now be described in detail. This method will be described for a single depth in the wellbore; it is of course to be understood that this method will be repeated for log measurements at multiple depths to the extent desired by the well operator or geologist.

The method according to the preferred embodiment of the invention begins with the retrieval of the desired well log data for the formations surrounding the wellbore of interest. This retrieval is indicated by processes 40a, 40b, 40c, shown as occurring in parallel in the flow chart of FIG. 6, since the relative timing of the retrieval is not important. Processes 40 are performed by obtaining thermal and epithermal neutron log measurements, for both thermal and epithermal neutrons, and also pulsed neutron capture measurements, of the formations surrounding the wellbore by way of conventional post-drilling wireline logging by logging tool 20 of FIG. 2. In the case of wireline logging, as noted above, separate tools 20', 20" may be run to obtain the thermal and epithermal neutron logs and the PNC logs. Typical logging speeds useful according to this embodiment of the invention is 1200 ft/hr for thermal and epithermal neutron logs, and 600 ft/hr for PNC logs. Preferably, the input data obtained and stored in processes 40 is the arithmetic average of three readings for each type of log at each depth in the wellbore.

The mechanisms of thermal and epithermal neutron logging and pulsed neutron capture logging will now be described in detail, for purposes of understanding the preferred embodiment of the invention.

Neutron Logging

As described in copending application Ser. No. 07/989,863, conventional thermal and epithermal neutron logging tools rely upon the mechanisms of scattering and absorption of neutrons of various energies by atoms of geological formations, from which certain attributes of the formation such as porosity may be determined. As described above, such tools include a neutron source, from which neutrons are emitted into the surrounding formation, and multiple detectors for detecting the number of neutrons returning to the tool. Detectors are located in the logging tool 14, 20 at different distances from the neutron source, so as to obtain both "near" and "far" measurements, as is well known in the art for eliminating borehole and drilling mud effects.

The neutrons are either scattered or absorbed upon collisions with atoms in the formation, with the likelihood of scattering or absorption depending upon the energy of neutron at the collision. It is known in the art that neutrons having an energy less than the thermal energy (i.e., 1.0 eV) are more likely to be absorbed than scattered in collisions, while epithermal neutrons (i.e., at energies above 1.0 eV) are more likely to be scattered than absorbed by collisions.

In the scattering case, some energy of the incident neutron is absorbed by the atom with which the neutron collides. For atoms in the formation of sufficiently high atomic number, a collision involving an incident neutron of epithermal energy will generally not result in absorption, but rather the incident neutron will be scattered; hydrogen, however, can completely stop an epithermal neutron in a single collision (i.e., in the case where the scattering angle between the incident and final directions is 180°). Since hydrogen is present to a large extent in both water and oil (relative to in the matrix), epithermal neutrons are absorbed by the presence of hydrocarbons and water, but will be relatively unaffected by the matrix portion of the formation.

An important measurement of a formation provided by epithermal neutron logs is thus the slowing-down length $L_s$ of the formation, which is a well-known measure of the distance in the formation that an epithermal neutron travels until being slowed (by collisions) to its thermal energy. As described in *Schlumberger's Technical Review*, Vol. 36, No. 1 (1988), correlation between the epithermal well log response $\Phi_e$ and the slowing down length $L_s$ in a formation has been derived as follows:

$$\Phi_e = \frac{296.9}{L_s^{2.9073}} - 0.0277$$

This slowing down length $L_s$ thus indicates the mount of hydrogen in the formation, which is relevant to formation porosity.

In contrast, thermal neutrons (i.e., neutrons at or below thermal energy) are both scattered and absorbed by the formation. An important parameter in neutron logs is the formation migration length $L_m$, which is a well-known measure of the distance from the source until absorption of a thermal neutron. The above-cited *Schlumberger Technical*

*Review* provides a correlation for the formation migration length $L_m$ with the thermal neutron response $\Phi_t$:

$$\phi_t = \frac{51.9}{L_m^{2.0181}} - 0.0455$$

Since both hydrogen atoms and matrix mineral atoms affect the migration of thermal neutrons, the migration length $L_m$ indicates the cumulative effects of matrix, water and oil in the formation.

Another important parameter for the formation is the diffusion length $L_d$, which is a measure of the distance traveled by an originally epithermal neutron from the point at which it has slowed to its thermal energy, until the point at which it is absorbed. The diffusion length $L_d$ thus contains the effects of absorption in the matrix of the formation and the pore fluid, which depend upon the formation lithology. Diffusion length $L_d$ may be determined as follows:

$$L_m^2 = L_s^2 + L_d^2$$

This diffusion length $L_d$ thus corresponds to the effects of both the matrix and the pore fluid upon the emitted neutrons.

The thermal and epithermal neutron responses $\Phi_t$, $\Phi_e$ are relative values, and are based upon the ratio of neutrons detected to those emitted by the well logging tool. According to the preferred embodiment of the invention, however, the actual near and far neutron counting rates are used to determine the absorption cross section of the formation. This is in contrast to conventional techniques, which use only the ratio between the near and far neutron counting rates, and not the absolute counting rates themselves, to determine the formation absorption. According to the preferred embodiment of the invention, therefore, processes 40a, 40b measure the thermal and epithermal neutron counting rates by way of both near and far measurements, store these measured near and far counting rates (preferably the arithmetic mean of three readings at each depth of interest) in memory (e.g., disk storage 30 of FIG. 4), and then retrieve the measured counting rates from memory by computer system 22 (FIGS. 1 through 3), for each depth of interest in the analysis.

Pulsed Neutron Capture (PNC) Logging

As is also well known in the art, well logging by way of pulsed neutron capture (PNC) logs provides information regarding the absorption cross section of the formation, through use of the neutron dieaway principle. According to this technique, as discussed above, neutrons, for example at energies of on the order of 14 MeV, are emitted into the formation from the logging tool. One or more detectors in the logging tool then detects gamma-rays generated by the absorption of the slowed-down neutrons, as a function of time. The neutron decay time $t_d$ (i.e., the time constant of the dropoff in detected gamma-rays) provides an formation absorption value $\Sigma_a$ according to the following correlation:

$$\Sigma_a = \frac{4550}{\tau_d}$$

The formation absorption value $\Sigma_a$ is the composite absorption of neutrons by the matrix ($\Sigma_{am}$), by water ($\Sigma_{aw}$) and by oil ($\Sigma_{ao}$). As such, one may represent the formation absorption value $\Sigma_a$ as the following sum:

$$\Sigma_a = \phi S_w \Sigma_{aw} + \phi(1-S_w)\Sigma_{ao} + (1-\phi)\Sigma_{am}$$

where $\Phi$ is the porosity of the formation (i.e., the fraction of the formation that is not matrix), and where $S_w$ is the water saturation (i.e., the fraction of the porous formation that contains water).

While the PNC log should be able to monitor water saturation $S_w$ because the salinity of the water renders the water absorption value $\Sigma_{aw}$ different from the oil absorption value $\Sigma_{ao}$, PNC logs have not been reliably successful in practice because the matrix absorption value $\Sigma_{am}$ can vary widely over very small distances in the formation. The method according to the preferred embodiment of the invention uses the PNC log together with the absolute neutron counts obtained from the thermal and epithermal log in order to determine water saturation value $S_w$.

Process 40c thus performs the pulsed neutron capture log to determine the composite formation absorption value $\Sigma_a$ (preferably as the mean of three readings at each depth of interest), stores this value for each depth in disk storage 30, and operates system computer 22 to retrieve the stored value $S_w$ for the particular depths of interest in the analysis.

Referring back to FIG. 6, upon retrieval of the neutron counting rates and PNC neutron log data in processes 40, process 42 is performed to select an initial assumed low value for porosity $\Phi$. As described in my copending application Ser. No. 07/989,863, porosity of the formation is determined according to the preferred embodiment of the invention in an iterative fashion, thus eliminating the need for extrinsic lithology information as obtained by core samples and the like in conventional porosity analysis. Preferably, as described in my copending application Ser. No. 07/989,863, a low value for porosity $\Phi$ is initially selected, such as $\Phi=0$.

According to the preferred embodiment of the invention, as shown in FIG. 6, the actual value of porosity $\Phi$ is determined by iteratively using an assumed value for porosity $\Phi$ in calculating the matrix diffusion length $L_{dm}$ according to two different methods. The assumed value for porosity $\Phi$ is adjusted after each iteration, until the difference between the matrix diffusion lengths $L_{dm}$ reaches a physically unrealizable result. The assumed porosity value at this condition is the actual porosity value $\Phi_a$ that will be used in the water saturation determination.

One of the methods of determining the matrix diffusion length $L_{dm}$ corresponds to the above description of the thermal and epithermal neutron logs. In process 44, the matrix migration length is calculated by system computer 22 based upon the thermal and epithermal neutron response data retrieved in process 40a, using the assumed value for porosity $\Phi$. Process 44 is based upon the simple correlation:

$$\phi_t = \phi + (1-\phi)\phi_m$$

where $\Phi_t$ is the thermal neutron tool response, and where $\Phi$ is the assumed porosity value as before. System computer 22 solves this correlation for $\Phi_{tm}$, which is the matrix response on the thermal neutron tool. Process 44 then determines the matrix migration length $L_{mm}$, using this matrix thermal response $\Phi_{tm}$ according to the correlation described above:

$$\phi_{tm} = \frac{51.9}{L_{mm}^{2.0181}} - 0.0455$$

In process 46, system computer 22 similarly determines the epithermal mat fix response $\Phi_{em}$, and thus the slowing down length $L_{sm}$ within the matrix, based upon the epithermal neutron tool response $\Phi_e$ and the assumed porosity value $\Phi$ as follows:

$$\phi_e = \phi + (1-\phi)\phi_{em}$$

After solving for epithermal matrix response $\Phi_{em}$, system computer 22 determines the matrix slowing down length $L_{sm}$ according to the epithermal correlation described above:

$$\phi_{em} = \frac{296.9}{L_{sm}^{2.9073}} - 0.0277$$

In process 48, system computer 22 uses the matrix migration length $L_{mm}$ determined in process 44 and the matrix slowing down length $L_{sm}$ determined in process 46, and solves for the matrix diffusion length $L_{dm}$ according to the following relationship:

$$L_{mm}^2 = L_{sm}^2 + L_{dm}^2$$

The matrix diffusion length $L_{dm}$ determined by this first method, and which will be referred to as $L_{dm1}$, is then stored by system computer 22 in memory.

The second independent method for determining the matrix diffusion length $L_{dm}$ will now be described in detail. This method begins with process 50, in which the matrix diffusion coefficient $D_m$ is determined. The determination of coefficient $D_m$ in process 50 is derived by first determining a formation diffusion coefficient $D_f$, of which the matrix diffusion coefficient $D_m$ is a component.

As discussed hereinabove, the thermal and epithermal neutron log responses may be used to derive the formation diffusion length $L_d$, which is a composite diffusion length for the entire formation (matrix plus porosity). This formation diffusion length $L_d$ is used by system computer 22, in combination with the formation absorption value $\Sigma_a$ as measured in the PNC log, to determine the formation diffusion coefficient $D_f$ according to the following relationship:

$$L_d^2 = \frac{D_f}{\Sigma_a}$$

This formation diffusion coefficient $D_f$ can be correlated to the diffusion coefficients of the constituents of the formation (i.e., the diffusion coefficients $D_w$, $D_o$, $D_w$ of matrix, oil and water, respectively), as follows:

$$\frac{1}{D_f} = \frac{\phi S_w}{D_w} + \frac{\phi(1-S_w)}{D_o} + \frac{1-\phi}{D_m}$$

where $\Phi$ is the porosity (using the iteratively assumed value) and $S_w$ is the water saturation value. However, because the neutron diffusion coefficients in fluid are not dependent upon salinity, the diffusion coefficients $D_w$ and $D_o$ are equal to one another, and are known. As such, the above equation reduces to:

$$\frac{1}{D_f} = \frac{\phi}{D_w} + \frac{1-\phi}{D_m}$$

This relationship is used by system computer 22 in process 50 to determine the matrix diffusion coefficient $D_m$.

In process 52, system computer 22 next determines the matrix absorption cross section $\Sigma_{am}$ based upon the actual counting rates of the near and far thermal neutrons. One may decompose the actual formation near and far counting rates N, F into the constituents of the formation as follows:

$$\frac{1}{N} = \alpha_n \phi S_w \Sigma_{aw} + \beta_n \phi (1-S_w)\Sigma_{ai} + \gamma_n (1-\phi)\Delta\Sigma_{am}$$

and $$\frac{1}{F} = \alpha_f \phi S_w \Sigma_{aw} + \beta_f \phi (1-S_w)\Sigma_{ai} + \gamma_f (1-\phi)\Delta\Sigma_{am}$$

where the factors $\alpha_n$, $\beta_n$, $\gamma_n$ are functions of the water slowing down length $L_{sw}$, oil slowing down length $L_{so}$, and matrix slowing down length $L_{sm}$, respectively, and also functions of the spacing $r_n$ of the near detector from the neutron source, and where the factors $\alpha_f$, $\beta_f$, $\gamma_f$ are functions of the water slowing down length, oil slowing down length, and matrix slowing down length, respectively, and also functions of the spacing $r_f$ of the far detector from the neutron source. Explicit expressions for $\alpha_n$, $\beta_n$, $\gamma_n$, $\alpha_f$, $\beta_f$, and $\gamma_f$ are set forth below:

$$\alpha_n = \frac{L_{st}^3}{L_{sw}^3} e^{r_n(\frac{1}{L_{st}} - \frac{1}{L_{sw}})}$$

$$\beta_n = \frac{L_{st}^3}{L_{so}^3} e^{r_n(\frac{1}{L_{st}} - \frac{1}{L_{so}})}$$

$$\gamma_n = \frac{L_{st}^3}{L_{sm}^3} e^{r_n(\frac{1}{L_{st}} - \frac{1}{L_{sm}})}$$

$$\alpha_f = \frac{L_{st}^3}{L_{sw}^3} e^{r_f(\frac{1}{L_{st}} - \frac{1}{L_{sw}})}$$

$$\beta_f = \frac{L_{st}^3}{L_{so}^3} e^{r_f(\frac{1}{L_{st}} - \frac{1}{L_{sw}})}$$

$$\gamma_f = \frac{L_{st}^3}{L_{sm}^3} e^{r_f(\frac{1}{L_{st}} - \frac{1}{L_{sm}})}$$

Multiplying the equation for 1/N by $\alpha_f$ and the equation for 1/F by $\alpha_n$ and subtracting provides:

$$\frac{\alpha_f}{N} - \frac{\alpha_n}{F} =$$

$$(\alpha_f \beta_n - \alpha_n \beta_f) \cdot \phi(1-S_w)\Sigma_{ao} + (\alpha_f \gamma_n - \alpha_n \gamma_f) \cdot (1-\phi)\Sigma_{am}$$

The term $L_{st}$ used in these relationships is the slowing-down length for the total formation. However, $\alpha_f \beta_n - \alpha_n \beta_f$ is zero because the slowing down lengths of neutrons in water and oil are the same (i.e., the slowing down length is independent of salinity). The above relationship is therefore independent of water saturation $S_w$, reducing to:

$$\frac{\alpha_f}{N} - \frac{\alpha_n}{F} = (\alpha_f \gamma_n - \alpha_n \gamma_f) \cdot (1-\phi)\Sigma_{am}$$

System computer 22 uses this relationship, along with the assumed value of porosity $\Phi$ and the values of $\alpha$, $\gamma$ for the near and far detectors in the logging tool to solve for the matrix absorption cross-section $\Sigma_{am}$ in process 52. It has been found that the correlations of:

$$\frac{1}{N} = \frac{\Phi S_w}{N_w} + \frac{(1-S_w)\Phi}{N_o} + \frac{1-\Phi}{N_m}$$

and

-continued
$$\frac{1}{F} = \frac{\Phi S_w}{F_w} + \frac{(1-S_w)\Phi}{F_o} + \frac{1-\Phi}{F_m}$$

are very good and acceptable approximations for the exact equations.

Process 54 is then performed, by way of which the matrix diffusion length $L_{dm}$ is calculated in this second method by system computer 22 according to the following:

$$L_{dm}^2 = \frac{D_m}{\Sigma_{am}}$$

This value of matrix diffusion length $L_{dm}$ is referred to as $L_{dm2}$.

In decision 55, system computer 22 determines the difference $\Delta L_{dm}$ between the matrix diffusion length $L_{dm1}$ determined in process 48 and the matrix diffusion length $L_{dm2}$ determined in process 54. If the difference $\Delta L_{dm}$ is below the diffusion length $L_d$ of the total formation, process 56 is performed by system computer 22 to slightly adjust the assumed value of porosity $\Phi$ (e.g., increasing its assumed value by 0.01), and returns control to processes 44, 46, 50 as described hereinabove. The process then continues until the difference $\Delta L_{dm}$ is above $L_d$, which is a physically unrealizable condition. At this point, the assumed value of porosity $\Phi$ may be used as actual porosity value $\Phi_a$ in the determination of water saturation $S_w$ as will now be described. The actual porosity value $\Phi_a$ is thus the value at which the difference in matrix diffusion lengths $L_{dm1}$ and $L_{dm2}$ is at the limit of a physically realizable quantity, according to the criteria used in the nuclear log computations.

The actual porosity value $\Phi_a$ will correspond to a total porosity, including both the formation macroporosity (as described hereinabove relative to FIG. 5) and also the microporosity of any clay in the formation. If desired, such as in formations in which clay is known to be present, upon determination of actual porosity value $\Phi_a$, system computer 22 may derive the formation macroporosity by first determining the formation clay volume $V_{clay}$ from a gamma ray well log (i.e., in which the natural gamma radiation from the clay is measured), and calculating the formation effective macroporosity value $\Phi_{eff}$ using the actual value of porosity $\Phi$ from decision 55 and the known clay microporosity $\Phi_{clay}$ as follows:

$$\phi_{eff} = \phi_1 - V_{clay}\phi_{clay}$$

If this optional procedure is used, then the effective macroporosity value $\Phi_{eff}$ is used as the actual porosity value $\Phi_a$ in the water saturation determination to be described hereinbelow.

Upon determination of the actual porosity value $\Phi_a$, system computer 22 then performs process 58, in which the water saturation $S_w$ is determined. According to this embodiment of the invention, the actual thermal and epithermal neutron counting rates, from both the near and far neutron detectors, are utilized along with the PNC log data, to solve for the water saturation $S_w$ in a manner that does not require extrinsic information regarding the lithology of the formation or the composition of the fluids in the reservoir.

The response equation of the PNC log may be expressed as the weighted sum of the response from each of the formation components (matrix, water, oil), where the weighting depends upon the porosity and water saturation of the formation, as well as upon the absorption cross section of each of the components. As such, the PNC response $\Sigma_a$ may be represented as:

$$\Sigma_a = \phi_a S_w \Sigma_{aw} + \phi_a(1-S_w)\Sigma_{ao} + (1-\phi_a)\Sigma_{am}$$

where $\Sigma_{ao}$, $\Sigma_{aw}$ are the PNC neutron log response components due to oil and water, respectively, which correlate to the absorption cross-section of oil and water.

Similarly, as noted above, the near and far thermal and epithermal neutron response may be decomposed into their components as follows:

$$\frac{1}{N} = \alpha_n \phi_a S_w \Sigma_{aw} + \beta_n \phi_a(1-S_w)\Sigma_{ao} + \gamma_n(1-\phi_a)\Delta\Sigma_{am}$$

and $$\frac{1}{F} = \alpha_f \phi_a S_w \Sigma_{aw} + \beta_f \phi_a(1-S_w)\Sigma_{ao} + \gamma_f(1-\phi_a)\Delta\Sigma_{am}$$

where the factors $\alpha_n$, $\beta_n$, $\gamma_n$ are functions of the water slowing down length, oil slowing down length, and matrix slowing down length, respectively, and also functions of the spacing of the near detector from the neutron source, and where the factors $\alpha_f$, $\beta_f$, $\gamma_f$ are functions of the water slowing down length, oil slowing down length, and matrix slowing down length, respectively, and also functions of the spacing of the far detector from the neutron source. These factors $\alpha$, $\beta$, $\gamma$ are determined for the thermal and epithermal neutron log tool according to the relationships given hereinabove.

These two equations, taken together, have two gowns, namely the water absorption cross section $\Sigma_{aw}$, which relates directly to water salinity, and the water saturation value $S_w$. The matrix absorption cross section $\Sigma_{am}$ is, as described above, known from the determination of porosity $\Phi$. In process 58, therefore, system computer 22 performs the necessary operations, according to conventional numerical techniques for the solution of a system of equations, to derive the solution for these two unknowns. Specifically, as discussed hereinabove, water saturation $S_w$ is of particular importance, as it will directly indicate the extent to which oil may be present in the logged reservoir.

In addition to the determination of the water saturation $S_w$ as described hereinabove, the formation absorption cross section $\Sigma_a$ determined in process 58 may optionally be used in conjunction with a gamma ray log to indicate the presence of heavy minerals. Heavy minerals in the formation are indicated by a very high absorption cross section $\Sigma_a$ in combination with low natural gamma radiation; examples of such minerals include siderite, hematite, and most iron-rich minerals. As such, comparison of the absorption cross section $\Sigma_a$ with the gamma radiation log can provide an indication of the presence of these heavy minerals.

The process of FIG. 6 is then repeated for each of the depths of interest along the wellbore. System computer 22 may, if desired, present out-put indicative of the porosity and water saturation of the formation as a function of depth along the borehole. Experiments have shown good agreement for the water saturation and porosity values determined according to the method of the preferred embodiment of the invention and porosity as found by actual core samples.

Numerical Example

By way of example, the method according to the preferred embodiment of the invention as described hereinabove has been applied to estimate porosity and water saturation for certain formations, with the results compared against actual core measurements of porosity and water saturation. An example of the log counts and the estimated porosity and water saturation values, and their comparison with core measurements, for one particular depth at a well location is given below in Table 1:

TABLE 1

| Measured Parameter | Value |
| --- | --- |
| Near thermal neutron count | 1253.1 sec$^{-1}$ |
| Far thermal neutron count | 410.4 sec$^{-1}$ |
| Near epithermal count | 3139.0 sec$^{-1}$ |
| Far epithermal count | 653.8 sec$^{-1}$ |
| Matrix absorption | 38.8 capture units |
| Gamma measurement | 51.5819 API |
| Calculated estimates | |
| Estimated porosity | 17.6231% |
| Water saturation | 40.3058% |
| Core measurements | |
| Porosity | 19.7796% |
| Water saturation | 45.400% |

As is evident from Table 1, the estimated values for porosity and water saturation closely agree with the core measurements for these parameters; the example of Table 1 is representative of the level of agreement for similar estimates at other depths and locations.

As is evident from the foregoing description of the preferred embodiment of the invention, and from the numerical example provided above, a method and system for determining the porosity and water saturation of formations surrounding existing wellbores is provided by the present invention, for which no extrinsic information regarding the lithology of the formation is necessary. The important advantages provided by the present invention are obtained through use of the combination of well log measurements that have previously been used individually, or in combination with extrinsic information or assumptions. This combination of the heretofore individually-used well log measurements provides a system of solvable equations, from which the important parameter of water saturation is obtained.

Furthermore, the water saturation values may be determined without extrinsic knowledge of the salinity of the water in the formation. Accordingly, the present invention provides more information from well logs than was provided by conventional techniques, and eliminates the need for expensive core sampling and analysis in determining these important formation parameters.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of determining the water saturation of a formation surrounding a wellbore, comprising:

obtaining thermal and epithermal neutron counting rate measurements from the formation at a plurality of depths;

obtaining pulsed neutron capture log measurements from the formation at a plurality of depths;

storing the thermal and epithermal neutron counting rate measurements and the pulsed neutron capture log measurements in a computer memory;

retrieving the thermal and epithermal neutron counting rate measurements and the pulsed neutron capture log measurements for a first depth of the plurality of depths from the computer memory;

selecting an initial porosity value;

using the initial porosity value, determining a first matrix diffusion length value at the first depth from the retrieved thermal and epithermal neutron counting rate measurements;

using the initial porosity value, determining a second matrix diffusion length value at the first depth from the retrieved pulsed neutron log measurements;

comparing the first and second matrix diffusion lengths to one another to determine a difference;

responsive to the difference between the first and second diffusion lengths being below a limit, adjusting the initial porosity value and repeating the determining steps;

responsive to the first and second matrix diffusion lengths at least reaching the limit, storing the adjusted initial porosity value as an actual porosity value; and determining the water saturation at the first depth by operating a computer to solve a system of equations corresponding to the actual porosity value, the retrieved thermal neutron counting rate measurements and the retrieved pulsed neutron capture measurements at the first depth.

2. The method of claim 1, wherein the formation comprises a matrix, oil and water;

and wherein the system of equations solved in the step of determining the water saturation comprises:

a first equation representative of the near thermal neutron absorption cross section of each of the matrix, oil and water; and a second equation representative of the far thermal neutron absorption cross section of each of the matrix, oil and water.

3. The method of claim 1, wherein the steps of retrieving, selecting, determining first and second matrix diffusion lengths, comparing, adjusting, storing and determining the water saturation are repeated for a plurality of depths.

4. The method of claim 1, further comprising:

obtaining gamma radiation measurements at the first depth to determining a clay quantity in the formation; and determining an effective macroporosity value using the clay quantity;

wherein the step of determining the water saturation uses the effective macroporosity value.

5. The method of claim 1, further comprising:

determining the salinity of the first depth by operating the computer to solve the system of equations.

6. The method of claim 1, wherein the steps of obtaining thermal and epithermal neutron counting rate measurements and obtaining pulsed neutron capture log measurements comprises:

performing a thermal neutron log in a previously drilled wellbore; and performing a pulsed neutron capture log in the previously drilled wellbore.

7. The method of claim 1, wherein the step of obtaining thermal and epithermal neutron counting rate measurements comprises:

emitting neutrons from a downhole source in a logging tool;

counting neutrons at a first neutron detector in the logging tool, to obtain near thermal neutron counting rate measurements; and counting neutrons at a second neutron detector in the logging tool, disposed further away from the source than the first neutron detector, to obtain far thermal neutron counting rate measurements.

8. The method of claim 7, wherein the system of equations comprises:

a first equation representative of the near thermal neutron absorption cross section of each of the matrix, oil and water based on the near thermal neutron counting rate measurements; and a second equation representative of the far thermal neutron absorption cross section of each of the matrix, oil and water based on the far thermal neutron counting rate measurements.

9. A system for analyzing water saturation of a formation surrounding a wellbore, comprising:

a computer memory, for storing thermal and epithermal neutron counting rate measurements and the pulsed neutron capture log measurements;

a computer, programmed to perform the steps of:

retrieving the thermal and epithermal neutron counting rate measurements and the pulsed neutron capture log measurements for each of the plurality of depths from the computer memory;

for each of the plurality of depths:

selecting an initial porosity value;

using the initial porosity value, determining a first matrix diffusion length value at the depth from the retrieved thermal and epithermal neutron counting rate measurements;

using the initial porosity value, determining a second matrix diffusion length value at the depth from the retrieved pulsed neutron log measurements;

comparing the first and second matrix diffusion lengths to determine a difference therebetween;

responsive to the difference between the first and second matrix diffusion lengths being below a limit, adjusting the initial porosity value and repeating the determining steps;

responsive to the difference between the first and second matrix diffusion lengths exceeding the limit, storing the adjusted initial porosity value as an actual porosity value; and determining the water saturation at the depth by solving a system of equations corresponding to the actual porosity value, the retrieved thermal neutron counting rate measurements and the retrieved pulsed neutron capture measurements at the first depth; and an output device, coupled to the computer, for displaying the water saturation at each of the plurality of depths.

10. The system of claim 9, further comprising:

means for obtaining the thermal and epithermal neutron counting rate measurements and the pulsed neutron capture log measurements for the formation.

11. The system of claim 10, wherein the obtaining means comprises:

at least one well logging tool for obtaining the thermal and epithermal neutron counting rate measurements and the pulsed neutron capture log measurements for the formation when suspended in the wellbore.

12. The system of claim 11, wherein the at least one well logging tool comprises at least one wireline logging tool.

13. The system of claim 11, wherein the at least one logging tool comprises:

a first logging tool having a neutron source, and first and second neutron detectors spaced apart from the neutron source by differing distances.

14. The system of claim 13, wherein the at least one logging tool further comprises:

a second logging tool having a high energy neutron source, and first and second gamma detectors spaced apart from the neutron source by differing distances.

15. The system of claim 9, wherein the formation comprises a matrix, oil and water;

and wherein the computer is programmed to solve the system of equations comprising:

a first equation representative of the near thermal neutron absorption cross section of each of the matrix, oil and water; and a second equation representative of the far thermal neutron absorption cross section of each of the matrix, oil and water.

16. The system of claim 9, wherein the computer is also programmed to perform the step of:

determining the salinity at the depth by solving the system of equations.

17. A computer-readable memory having a storage medium configured so that, when read and used by a computer, the computer is directed to determine the water saturation of a formation surrounding a wellbore, wherein the computer has a memory for storing digital data corresponding to thermal and epithermal neutron counting rate measurements from the formation at a plurality of depths, and for storing digital data corresponding to pulsed neutron capture log measurements from the formation at a plurality of depths, and wherein the computer is so directed by a plurality of operations comprising:

storing the thermal and epithermal neutron counting rate measurements and the pulsed neutron capture log measurements in computer memory;

retrieving the thermal and epithermal neutron counting rate measurements and the pulsed neutron capture log measurements for a first depth of the plurality of depths from the computer memory;

selecting an initial porosity value;

using the initial porosity value, determining a first matrix diffusion length value at the first depth from the retrieved thermal and epithermal neutron counting rate measurements;

using the initial porosity value, determining a second matrix diffusion length value at the first depth from the retrieved pulsed neutron log measurements;

comparing the first and second matrix diffusion lengths to one another;

responsive to the first and second matrix diffusion lengths differing from one another by less than a limit, adjusting the initial porosity value and repeating the determining steps;

responsive to the first and second matrix diffusion lengths differing from one another by more than the limit, storing the adjusted initial porosity value as an actual porosity value; and determining the water saturation at the first depth by operating a computer to solve a system of equations corresponding to the retrieved thermal neutron counting rate measurements and the retrieved pulsed neutron capture measurements at the first depth.

18. The computer-readable memory of claim 17, wherein the formation comprises a matrix, oil and water;

and wherein the system of equations solved in the step of determining the water saturation comprises:
- a first equation representative of the near thermal neutron absorption cross section of each of the matrix, oil and water; and
- a second equation representative of the far thermal neutron absorption cross section of each of the matrix, oil and water.

19. The computer-readable memory of claim 17, wherein the steps of retrieving, selecting, determining first and second matrix diffusion lengths, comparing, adjusting, storing and determining the water saturation are repeated for a plurality of depths.

20. The computer-readable memory of claim 17, wherein the plurality of operations further comprises:

determining the salinity of the first depth by operating the computer to solve the system of equations.

21. The computer-readable memory of claim 17, wherein the stored thermal and epithermal neutron counting rate measurements each include near and far thermal neutron counting rate measurements.

22. The computer-readable memory of claim 21, wherein the system of equations comprises:
- a first equation representative of the near thermal neutron absorption cross section of each of the matrix, oil and water based on the near thermal neutron counting rate measurements; and
- a second equation representative of the far thermal neutron absorption cross section of each of the matrix, oil and water based on the far thermal neutron counting rate measurements.

* * * * *